Figure 1:
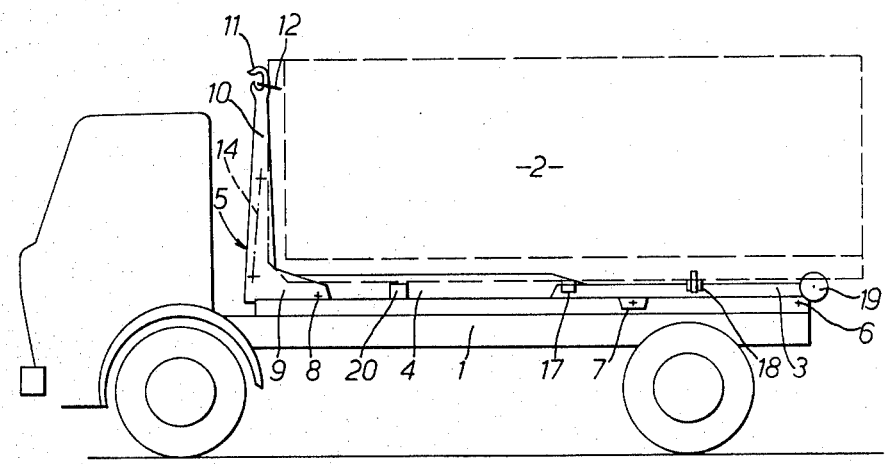

United States Patent [19]

Sutela et al.

[11] 4,290,726
[45] Sep. 22, 1981

[54] EQUIPMENT FOR LOADING OF AN EXCHANGE PLATFORM OR CONTAINER

[75] Inventors: Leo Sutela, Turku; Heikki Laitinen, Raisio, both of Finland

[73] Assignee: Oy Partek AB, Raisio, Finland

[21] Appl. No.: 84,059

[22] Filed: Oct. 12, 1979

[30] Foreign Application Priority Data

Nov. 8, 1978 [FI] Finland .................................. 783401

[51] Int. Cl.³ .............................................. B60P 1/64
[52] U.S. Cl. .................................... 414/421; 414/498; 414/546
[58] Field of Search ............... 414/420, 421, 498, 546, 414/555, 556, 491

[56] References Cited

U.S. PATENT DOCUMENTS 3,825,137  7/1974  Mackrill et al. ..................... 414/498
4,175,904  11/1979  Airaksinen ...................... 414/498 X

FOREIGN PATENT DOCUMENTS 7702392  9/1978  Netherlands ........................ 414/498

Primary Examiner—Robert G. Sheridan
Attorney, Agent, or Firm—Burns, Doane, Swecker & Mathis

[57] ABSTRACT

Apparatus for loading a container onto a truck or trailer, and for dumping the container, includes a first frame pivotally attached to the rear of the truck or trailer and a second frame pivotally mounted on the first frame. An L-shaped member is pivotally mounted on the second frame, and its pivotal movement is controlled independently of the pivotal movement of the two frames by a piston and cylinder arrangement. The path of movement of the grasping end of the L-shaped member is twice the length of the section of the member that is connected to the second frame, to enable different sized containers to be transported and dumped in different positions on the truck or trailer.

5 Claims, 13 Drawing Figures

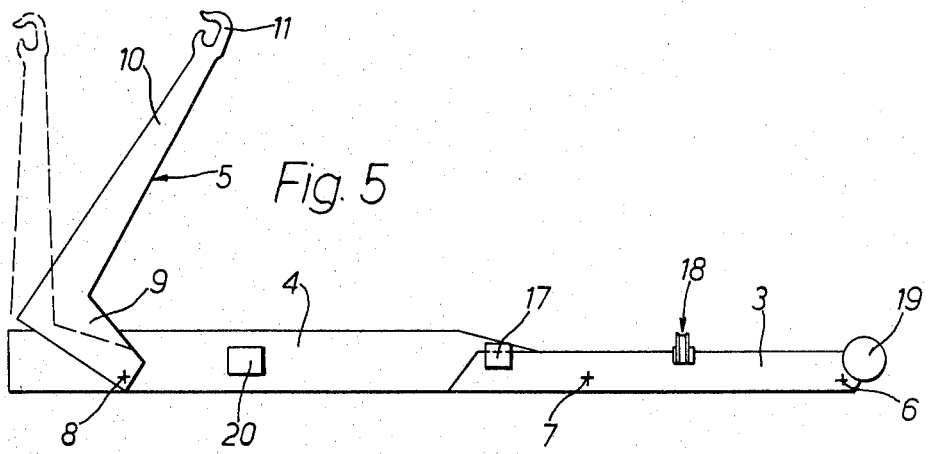
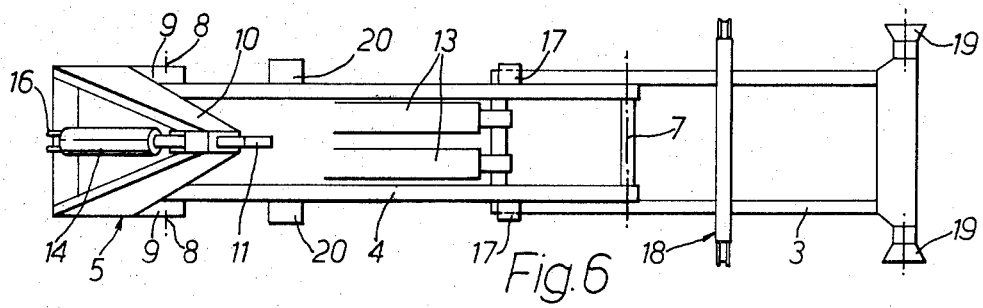
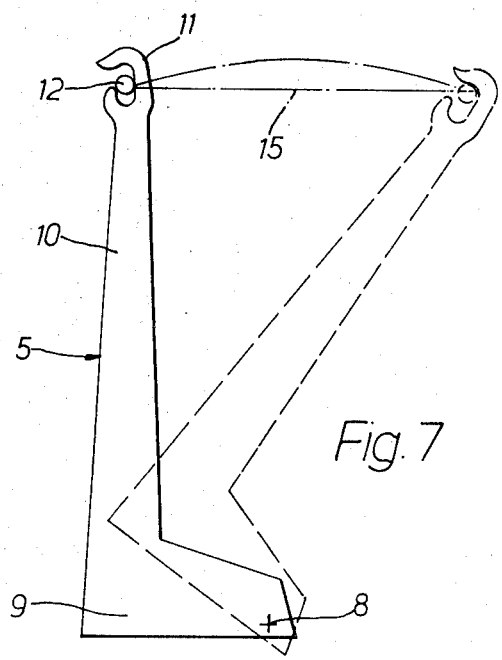

EQUIPMENT FOR LOADING OF AN EXCHANGE PLATFORM OR CONTAINER

The subject of the present invention is an equipment for loading of an exchange platform or container onto a truck or trailer and for removing same from the truck or trailer and for dumping the exchange platform or container, said equipment comprising a rear frame mounted pivotably by means of a transverse, horizontal shaft or articulated joints placed at the rear end of the frame beams of the truck or trailer, to which rear frame a middle frame of the loading equipment is pivotably mounted at one of its ends by means of a transverse, horizontal shaft or articulated joints, at one end, or in immediate proximity of one end, of which middle frame an angle piece is pivotally mounted as by means of a transverse, horizontal shaft or articulated joints around the rear end of its horizontal part or parts, while the vertical part of the angle piece is at its upper end provided with a grasping means, such as a hook, for the purpose of engaging a corresponding grasping component at the front wall of the exchange platform or container, and wherein the main cylinder or two parallel main cylinders operating the loading equipment are arranged so that their one end can be fastened to the frame of the truck or trailer and the other end to the middle frame of the loading equipment and, for the purpose of turning the angle-piece independently in relation to the middle frame, a cylinder-piston device is been arranged between the angle piece and the middle frame.

Several devices of different types are previously known by means of which it is possible to load an exchange platform onto a vehicle and to remove it from same and, moreover, to perform dumping of the exchange platform. Such devices are often so-called hook devices, which comprise an angle piece pivoting around a transverse shaft in relation to the frame of the vehicle, the upper end of said angle piece being provided with a hook for grasping the exchange platform. Known loading devices of the hook type are described, e.g., in the Finnish patent applications No 2646/71 and 3474/72 and in the German patent application No. 2,557,169.1. An important drawback of the equipment of the Finnish patent application No. 2646/71 is the guiding of the angle piece by means of a guide construction, which solution is cumbersome and costly to manufacture. Moreover, therein both the guides and the cylinder-piston device moving the angle piece in the guides are completely exposed to dirt in the transport position, because both of them are in the extended position. The hook-type loading equipment of the Finnish patent application No. 3474/72 consists of a highly complicated unit involving several lever mechanisms interconnected to each other, wherein, by making use of said lever arrangements, a loading movement is performed by means of a main cylinder, during which movement the movement of the angle piece cannot be controlled independently from other operations. In the hook-type loading equipment of the German patent application No. 2,557,169.1, the construction is quite simple, but when an exchangeable platform is being loaded, that equipment is only capable of producing such courses of movement any of whose intermediate stages are not suitable for transportation of the exchange platform, i.e. the platform is not in transport position at said intermediate stages.

It is an objective of the present invention to provide a loading equipment at which it is alternatively possible to select a long-platform position or a short-platform position, in each of which positions the exchange platform can be locked in position for transportation and in each of which positions the exchange platform can also be dumped.

The loading equipment in accordance with the present invention is mainly characterized in that the length of the span corresponding to the maximum length of the track of the shape of an arc of a circle of the grasping means of the angle piece produced by the stroke length of the cylinder-piston device placed between the angle piece and the middle frame is substantially double as compared with the length of the horizontal part or parts of the angle piece and that the vertical part of the angle piece is in a way in itself known essentially longer than the horizontal part or parts of the angle piece and that the bending movement, i.e. the pivoting movement towards the rear, of the angle piece in relation to the middle frame has been designed so that it can be accomplished advantageously by means of the compression or pushing movement of the cylinder-piston device placed between said angle piece and the middle frame.

Figure 8:
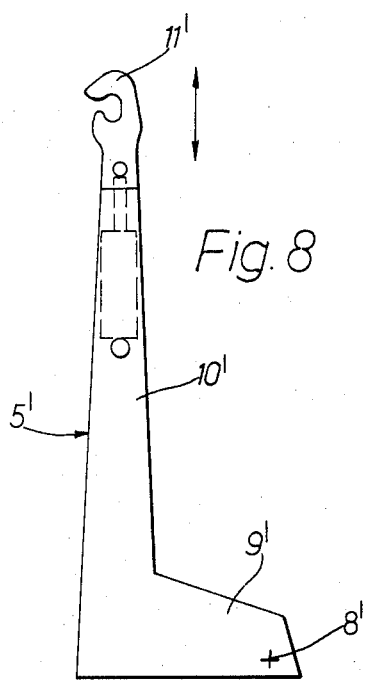
Figure 9:
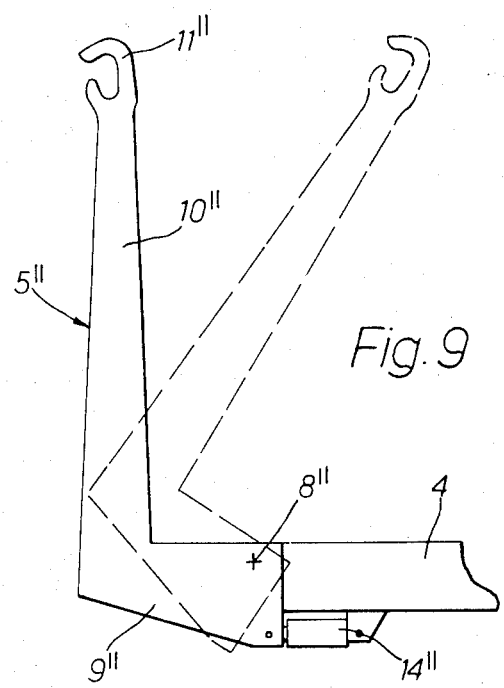
Figure 10:
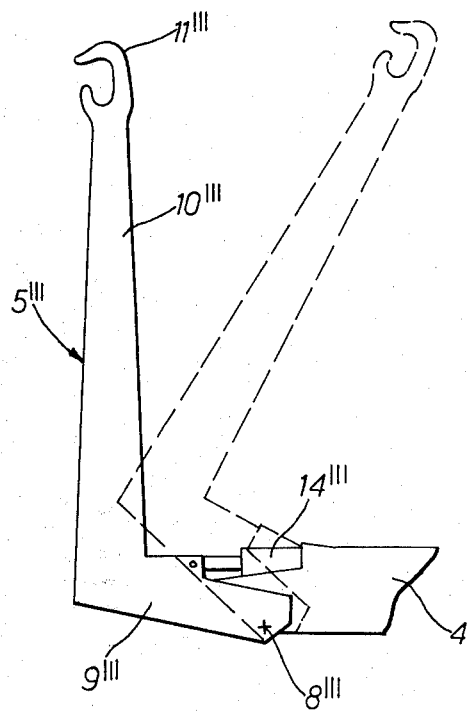
Figure 11:
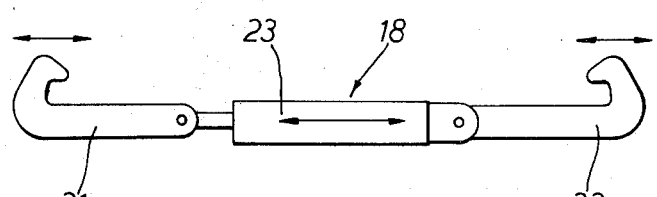
Figure 12:
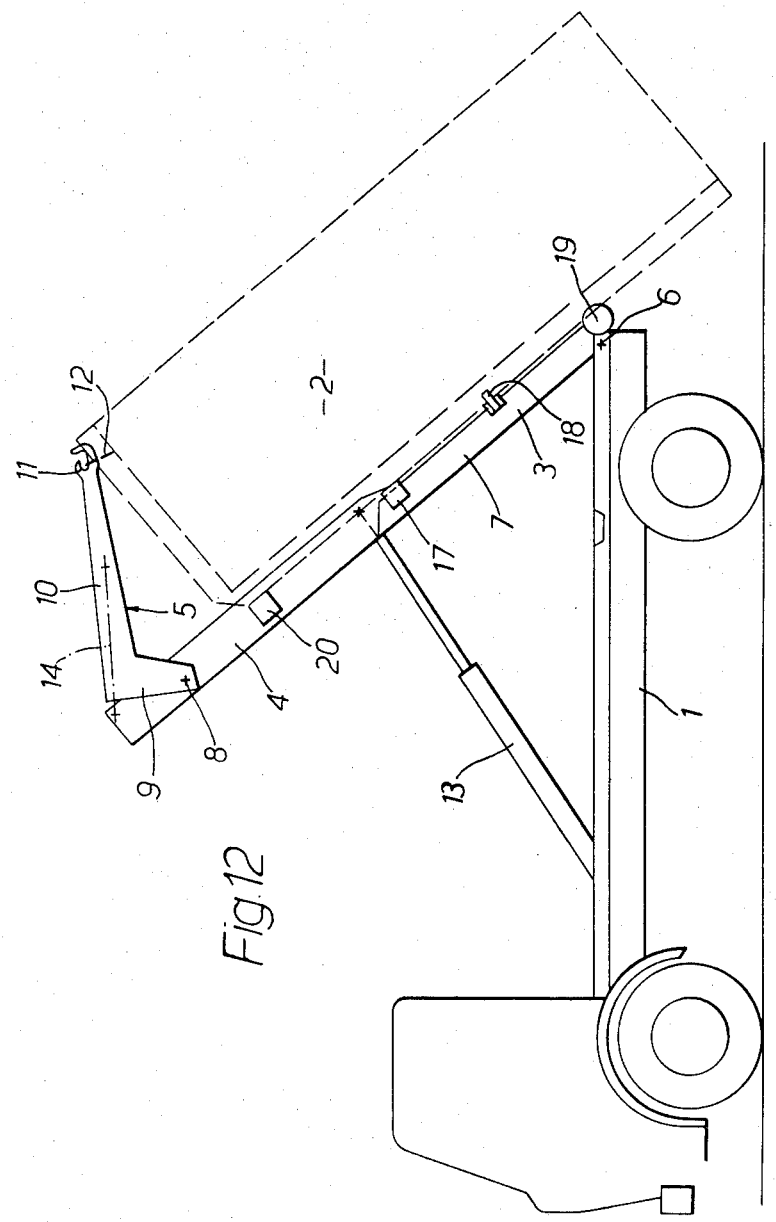
Figure 13:
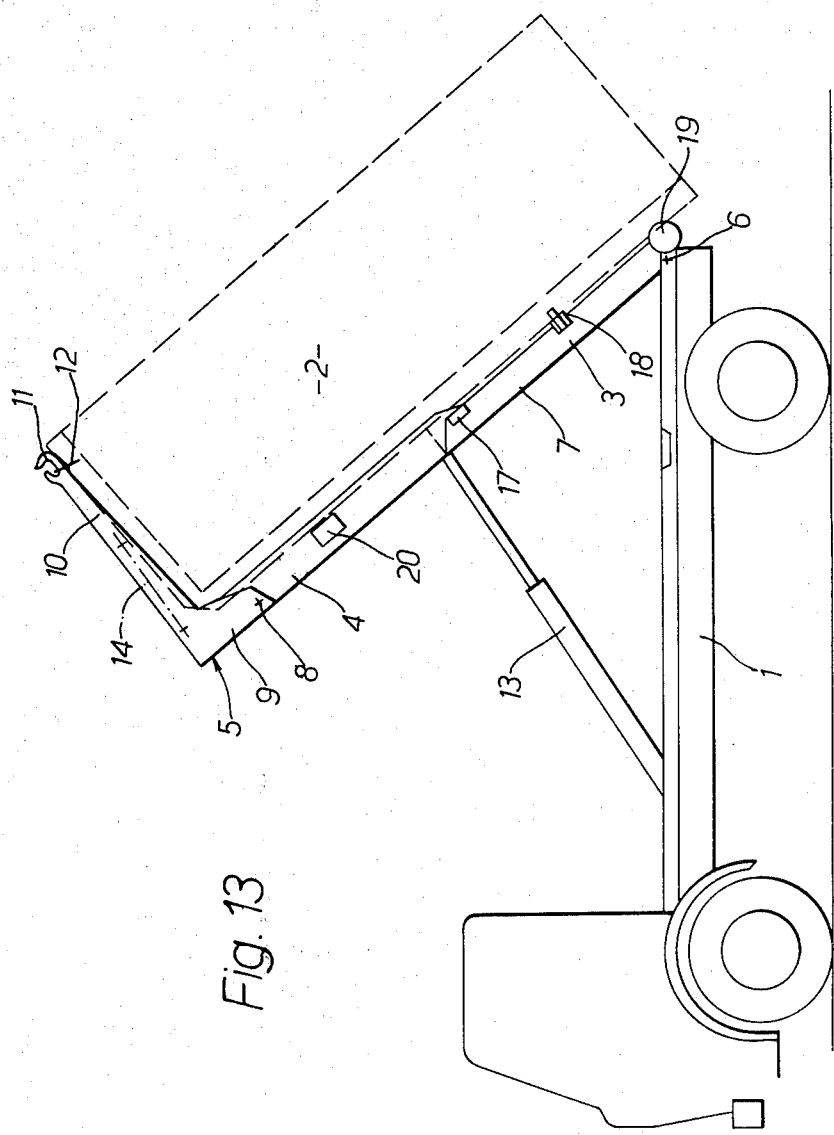

The invention comes out more closely from the following description and from the attached drawings, wherein FIGS. 1 to 4 are schematical side views of a truck provided with the loading equipment in accordance with the invention at different stages of loading, FIG. 5 is a side view of the loading equipment, FIG. 6 is a view from above of the loading equipment, FIG. 7 is a side view of the angle piece of the loading equipment, FIG. 8 shows an embodiment alternative to the angle piece shown in FIG. 7, FIGS. 9 and 10 show embodiments alternative to the pivoting arrangement of angle piece shown in FIGS. 1 to 6, FIG. 11 shows a locking device related to the loading equipment and designed for locking the exchange platform, and FIGS. 12 and 13 show an exchange platform in two different positions of dumping.

The loading equipment comprises three frame parts: the rear frame 3, the middle frame 4, and the angle piece 5. As is shown in FIGS. 1 to 4, the rear frame 3 is at its rear part, by means of articulated joints 6, fastened to the rear end of the frame beams 1 of a truck. The rear frame 3 can pivot around the articulated joints 6 in relation to the frame beams 1, i.e. the rear frame 3 can be pivoted in relation to the frame beams 1 into the ordinary dumping position. As is shown in FIGS. 5 and 6, the rear end of the rear frame 3 is provided with support rollers 19 for supporting and guiding the exchange platform 2 during loading. The rear frame 3 also includes a locking device 18 for locking the exchange platform onto the loading equipment. The locking device 18 will be described in more detail later on. A middle frame 4 is at one of its ends fastened to the rear frame 3 pivotably by means of a horizontal shaft 7 or articulated joints. The front end of the rear frame 3 of the loading equipment extends forward essentially beyond the articulated joint position 7 between the rear frame 3 and the middle frame 4. The middle frame 4 is provided with counterpieces 17 projecting towards the sides at the level of the ends of the rear frame 3 and, in the position shown in FIGS. 5 and 6, supported against the upper face of the front part of the rear frame thus preventing the middle frame 4 from pivoting, in relation to the articulated joint 7 between the middle frame 4 and the rear frame 3, above the rear frame 3 and passing by the front end of the rear frame 3 to underneath the rear frame.

Referring to FIGS. 3, 4, 6, 12, and 13, two parallel main cylinder-piston devices 13 have been arranged between the middle frame 4 and the frame beams 1 of the truck. An angle piece 5 is fastened to the front end of the middle frame 4, or in immediate proximity of the front end of the middle frame 4, and is pivotable at the rear ends of the horizontal parts 9 in relation to a transversal horizontal shaft or to articulated joints 8.

The vertical part 10 of the angle piece 5 is at the upper end provided with a grasping means, such as a hook 11, for engaging the corresponding grasping component 12 at the front wall of the exchange platform 2 or container. For the purpose of pivoting the angle piece 5 independently in relation to the middle frame 4, a cylinder-piston device 14 has been arranged between the angle piece 5 and the middle frame 4. In the case of FIGS. 1 to 6, the front end of the middle frame 4 extends forward beyond the articulated joint 8 between the angle piece 5 and the middle frame 4 an amount substantially corresponding to the length of the horizontal parts 9 of the angle piece 5, and here the cylinder-piston device 14 placed between the angle piece 5 and the middle frame 4 is at one of its ends fastened to the vertical part 10 of the angle piece 5 and at the other end to the front end of the middle frame 4 ahead of the articulated joint 8 between the angle piece 5 and the middle frame 4 so that the cylinder-piston device 14 is positioned in the intermediate space between the branches of the angle piece 5 (FIG. 6).

According to the embodiment shown in FIG. 9, the cylinder-piston device 14" arranged between the angle piece 5" and the middle frame 4 is positioned underneath the middle frame 4 so that one of its ends is fastened to the horizontal part 9" of the angle piece 5" underneath the articulated joint 8" between the angle piece 5" and the middle frame 4 and the other end is fastened to the middle frame 4 a sufficient distance from said articulated joint 8" towards the rear frame 3.

According to the embodiment shown in FIG. 10, the cylinder-piston device 14''' arranged between the angle piece 5''' and the middle frame 4 is positioned above the middle frame 4 so that one of its ends is fastened to the horizontal part 9''' of the angle piece 5''' above the articulated joint 8''' between the angle piece 5''' and the middle frame 4 and the other end to the middle frame 4 a sufficient distance from said articulated joint 8''' towards the rear frame.

According to FIG. 7, the grasping means 11 of the angle piece 5 of the loading equipment consists of a hook in whose mouth the play in the longitudinal direction of the vertical part 10 of the angle piece corresponds to the maximum difference in height of the track of the shape of an arc of a circle formed by the hook in relation to the middle frame 4. Said track of the shape of an arc of a circle is formed when the angle piece 5 is pivoted by means of the cylinder-piston device 14 in relation to the middle frame 4.

According to the embodiment shown in FIG. 8, instead of a play in the mouth of the hook 11, the grasping means 11 has been arranged as moving or movable in the longitudinal direction of the vertical part 10' of the angle piece 5' over the distance corresponding to the play described above, in relation to the vertical part 10' of the angle piece 5'.

In FIG. 1, an exchange platform 2 is placed on the frame beams 1 of a truck in the transport position. Then the bottom beams of the exchange platform 2 lie on the rear frame 3 and on the support rollers 19 in the rear part of the rear frame 3 and, at the front end, on the supports 20 placed on the sides of the middle frame 4. Moreover, the hook 11 of the angle piece 5 is engaged on the grasping component 12 of the exchange platform 2. The exchange platform 2 is at the bottom edges of its bottom beams, which are, e.g., I-beams, at the outer edges locked by means of a locking device 18 in relation to the rear frame 3. The locking device 18, placed about at the middle of the rear frame 3 transverse thereto is illustrated in FIG. 11. Referring to FIG. 11, the locking device comprises two hook-shaped components 21 and 22, which are fastened to the rear frame of the loading equipment so that they can move in the direction of the arrows shown in FIG. 11, i.e. they may move towards each other and away from each other. A cylinder-piston device 23 is arranged between the hook-shaped components 21 and 22, by means of which cylinder-piston device the inward-outward movement of the hook-shaped components 21 and 22 is produced: inward movement so as to lock the exchange platform 2 to the rear frame 3, and outward movement in order to open the locking.

Figure 2:
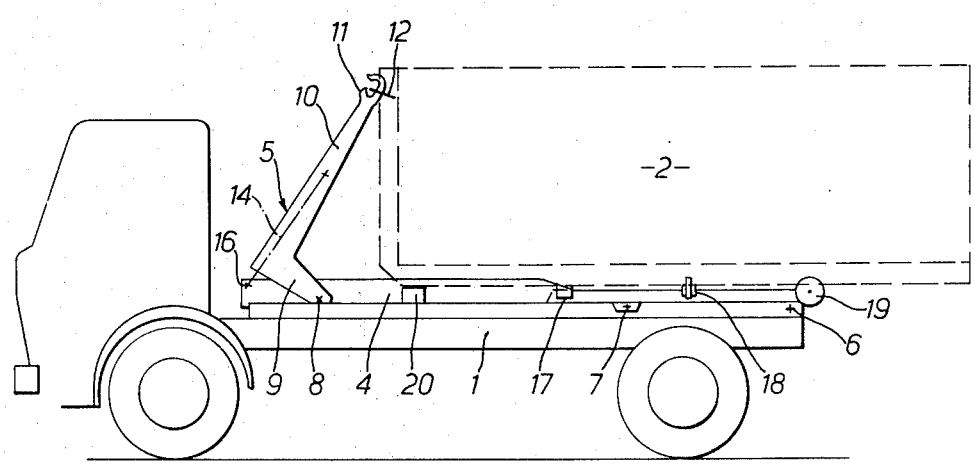

When the locking means 18 are opened in the stage shown in FIG. 1, the exchange platform 2 can be shifted backwards by bending the angle piece 5 to the position shown in FIG. 2. The length of the span 15 corresponding to the maximum length of the track of the shape of an arc of a circle of the grasping means 11 of the angle piece 5 produced by the stroke length of the cylinder-piston device 14 placed between the angle piece 5 and the middle frame 4 is substantially double as compared with the length of the horizontal part or parts 9 of the angle piece 5, and the vertical part 10 of the angle piece 5 is in a way in itself known essentially longer than the horizontal part or parts 9 of the angle piece.

Figure 3:
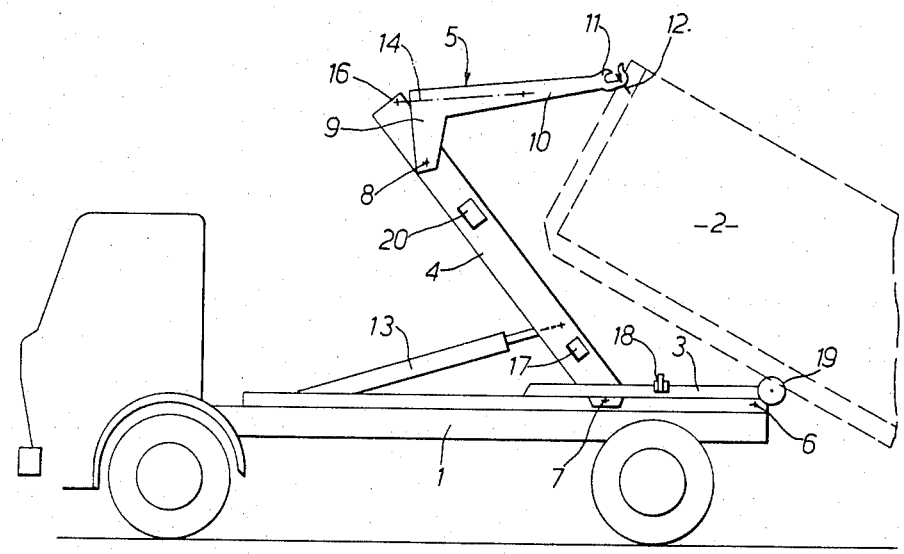
Figure 4:
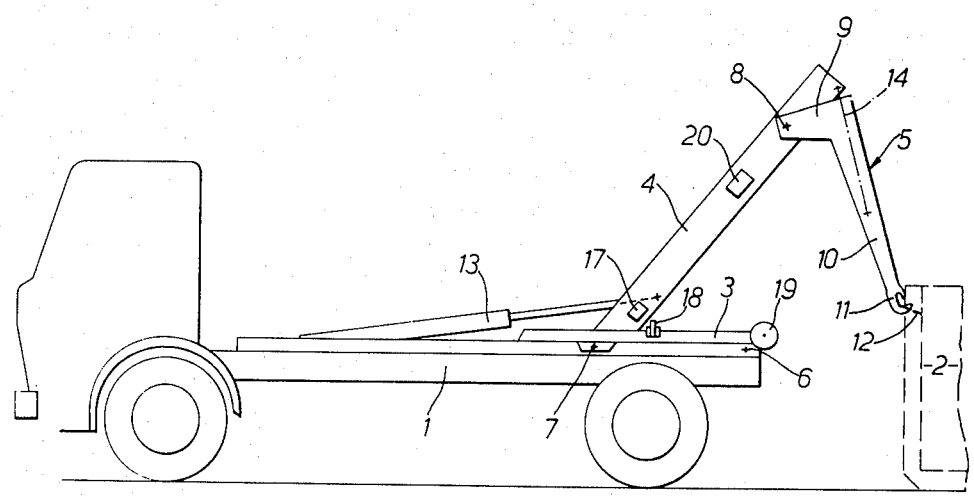

From the stage shown in FIG. 2, by means of the main cylinders 13, the middle frame 4 can be pivoted in relation to the horizontal shaft 7 to the position shown in FIG. 3 and further to the position shown in FIG. 4, at which the exchange platform has already been removed from the truck chassis down onto the ground. When the truck is driven forwards from said stage (FIG. 4), the hook 11 of the angle piece 5 is detached from the grasping component 12 of the exchange platform 2.

The pulling of an exchange platform 2 from the ground onto the chassis of a truck takes place in the order opposite to that described above. First, the grasping component 12 of the exchange platform 2 is engaged by the hook 11 (FIG. 4), the middle frame 4 is pivoted in relation to the horizontal shaft 7 (FIG. 3) by means of pulling movement of the cylinder-piston device 13 until the stage shown in FIG. 2 is reached. Hereupon the angle piece 5 is pivoted by means of the cylinder-piston device 14 so that the exchange platform 2 becomes pulled to the front position (FIG. 1), at which position the exchange platform 2 is locked by means of the locking device 18. If the exchange platform 2 is a short truck-bed, the angle piece 5 is all the times kept in the bent position shown in FIG. 2. It should be noticed in particular that irrespective of whether the platform 2 is in the position shown in FIG. 1 or in that shown in FIG.

2 or in any position whatsoever between them, nothing prevents locking of the platform 2 to the rear frame 2 by means of the locking device 18.

If one wishes to dump the exchange platform 2 by means of the loading equipment in accordance with the present invention, in the stage of FIG. 1 or of FIG. 2 the locking device 18 is kept in the locked position and the dumping movement is performed by means of the main cylinders 13 as shown in FIG. 13 or FIG. 12. Then, consequently, the loading equipment is, at the rear frame 3, locked by the locking device 18 to the bottom beams of the exchange platform, and the three parts of the loading equipment, i.e. the angle piece 5, the middle frame 4, and the rear frame 3, as supported by the exchange platform, are pivoted in relation to the articulated joint 6.

What we claim is:

1. Apparatus provided on a vehicle for moving an exchangeable container onto the vehicle and for removing same from the vehicle and for tipping the container when mounted on the vehicle, said apparatus comprising a rear frame pivotably connected at its rear end to the rear end of the vehicle, a second frame pivotably connected at one end to said rear frame, a substantially L-shaped member having one limb pivotably connected to said second frame, the other limb of said L-shaped member being provided at its outer end with engaging means for engaging a member provided on the front end of the container, a first piston and cylinder device having one end connected to the vehicle and its other end connected to the second frame for pivoting the second frame, and a second piston and cylinder device arranged between the L-shaped member and the second frame for pivoting the L-shaped member about its pivot connection with the second frame, said L-shaped member being divided longitudinally from a point below the engaging means to form two branches which diverge from each other transversely of the vehicle and which at their lower end extend rearwardly to form said one limb, the forward end of said second frame extending forwardly beyond the pivot connection between the L-shaped member and said second frame by a distance substantially corresponding to the length of the parts forming said one limb of the L-shaped member, said second piston and cylinder device being located between said two diverging branches of the L-shaped member and being connected to said other limb and to the second frame at a position forwardly of the pivot connection between the L-shaped member and the second frame, the length of the cord between the position of the engaging means when said other limb is vertical and the position of the engaging means when the L-shaped member has been pivoted by the full stroke of the second piston and cylinder device about the pivot connection with the second frame being substantially double the length of said one limb of the L-shaped member, and said other limb of the L-shaped member being longer than said one limb.

2. Apparatus as claimed in claim 1, in which the engaging means of the L-shaped member consists of a hook having play in the direction of the vertical limb of the L-shaped member, that corresponds to the maximum difference in height of the track of the shape of an arc of a circle formed by the hook in relation to the second frame.

3. The apparatus of claim 1 wherein said engaging means comprises a hook that is arranged so that it can be moved a distance in the direction of the vertical limb of the L-shaped member corresponding to the maximum difference in height of the track of the shape of an arc of a circle formed by the hook in relation to the second frame.

4. Apparatus as claimed in claim 1, in which the front end of the rear frame extends forward beyond the pivot connection between the rear frame and the second frame and the second frame and the front end of the rear frame are provided with jointly operative members which prevent the second frame from pivoting downwardly beyond an aligned position.

5. Apparatus as claimed in claim 1, in which means for locking the container to the rear frame is provided in the rear frame substantially at the mid-length of the rear frame.

* * * * *